Sept. 12, 1967          T. A. DEAKINS          3,341,232
PIPE JOINT
Original Filed July 17, 1964
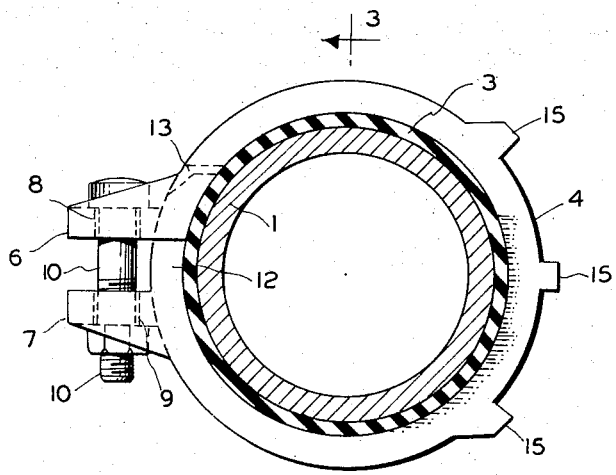
FIG.1
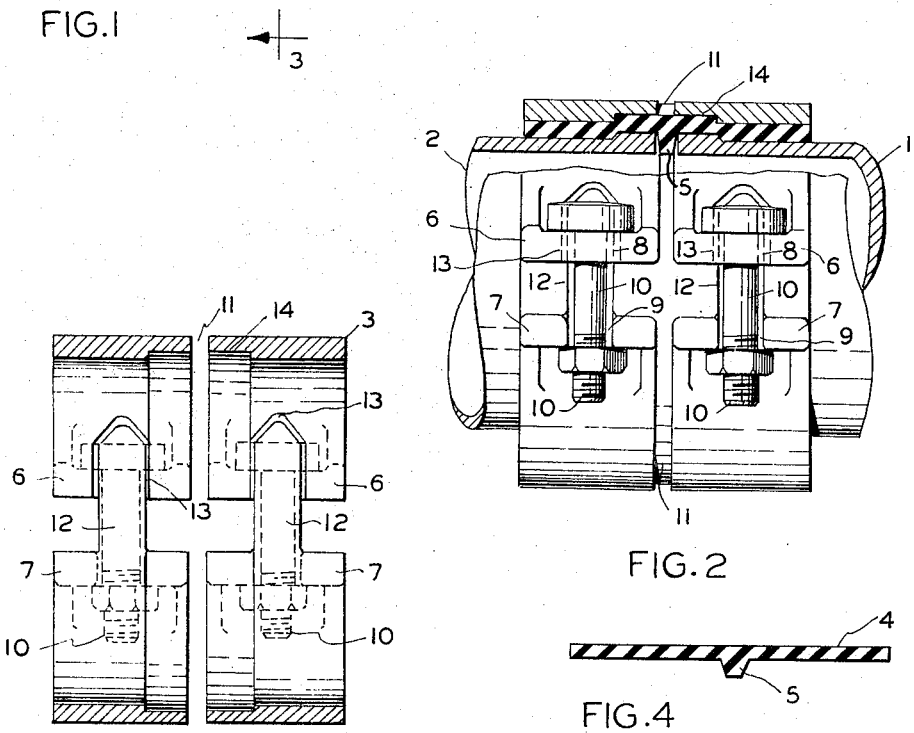
FIG.2
FIG.3
FIG.4
INVENTOR
THOMAS A. DEAKINS
BY Paul J. Gushenk
ATTORNEY United States Patent Office 3,341,232
Patented Sept. 12, 1967

3,341,232
PIPE JOINT
Thomas A. Deakins, Chattanooga, Tenn., assignor to United States Pipe and Foundry Company, Birmingham, Ala., a corporation of New Jersey
Continuation of application Ser. No. 383,272, July 17, 1964. This application Sept. 9, 1966, Ser. No. 578,413
3 Claims. (Cl. 285—373)

This application is a continuation of application, Ser. No. 383,272, filed July 17, 1964, now abandoned.

This invention relates to pipe couplings and consists more particularly in new and useful improvements in couplings designed for connecting aligned sections of pipes having plain and/or beaded ends. While the herein described embodiments are directed to cast iron soil pipe, its construction and principle of operation may also be applied to couplings for use with other materials, including those formed of rigid plastic material.

In conventional sewer installations, domestic plumbing and the like, it has long been the practice to join lengths of pipe by means of a caulked bell and spigot joint. This type joint is made up by telescoping the plain or beaded end of one pipe into an enlargement or bell on the end of a second pipe, and filling the annular space between the two with suitable caulking material. Bell and spigot pipe is expensive since special coring and molding are required to form the bell on the pipe, the bell adds extra weight to the pipe and there is a loss in laying length due to the telescoping of the spigot into the bell. Also, the installation of such pipe is slow and expensive since, in addition to requiring considerable skilled labor, the cost of caulking materials such as lead and oakum is high.

In addition, the enlarged bell ends often require that additional wall space be provided when it is necessary to pass the pipe up a wall. For example, a standard size of pipe for house installation is a 3" pipe having an outside diameter of approximately 3 and ⅜". However, the average outside diameter of the bell for standard 3" pipe is approximately 5". Thus, the pipe cannot be installed in a standard 2" x 4" stud wall which provides a wall space of only 3 and ¾". Another difficulty with caulked joints results from the fact that the caulked material is not resilient so that any appreciable deflection of the joint caused by settling of the surrounding structure will result in a leaky joint.

Recently a coupling has become available for cast iron soil pipe which permits the joining of plain and/or beaded end cast iron pipe and which overcomes most of the enumerated disadvantages of bell and spigot pipe. This coupling comprises a rubber sleeve into which the two pipe ends fit, a corrugated light gauge metal strip overlaying the rubber sleeve, and two tightening straps which clamp each side of the metal strip against the gasket which is in turn pressed tightly against each pipe member to form a complete circumferential seal. This coupling has the disadvantage that it offers very little resistance to deflection while permitting extreme deflection. As a result, additional supports and braces are required both during and after construction of the surrounding structure.

It is an object of this invention to provide a pipe coupling for cast iron pipe which is easy, quick and simple to assemble and which overcomes the disadvantages enumerated above the presently used joining methods.

It is a further object of the invention to provide a joint for cast iron pipe arranged in abutting relation, including a coupling unit which may be applied around the adjacent pipe ends to effect a fluid tight seal without appreciably increasing the outside diameter thereof, whereby the pipe may be installed in places only slightly bigger than the outside diameter of the pipes.

A still further object of the invention is the provision of a joint for cast iron pipe arranged in abutting relation, including a coupling unit which limits deflection of the joint to within desirable limits and effects a fluid tight seal throughout the permissible limits of deflection.

Referring to the drawings in which numerals of like character designate similar parts throughout the several views:

FIGURE 1 is an end view of the coupling device of the present invention mounted in place on pipes with the pipes being shown in section;

FIGURE 2 is a side view of the coupling as seen from the left in FIGURE 1 with a portion cut away to show the relative position of the pipes being joined, the sleeve and the clamping ring; and FIGURE 3 is a cross section of the clamping ring taken along the line 3—3 in FIGURE 1.

FIGURE 4 shows the cross-sectional shape of the sealing sleeve before joint assembly.

As illustrated in FIGURES 1 and 2, the pipe joint of the present invention is applied to two sections of cast iron pipe 1 and 2, arranged in end-to-end alignment, and includes a clamping band 3 which encircles and overlaps the adjacent ends of the pipe sections. An annular, resilient sealing sleeve 4 is interposed between the band 3 and the pipe sections 1 and 2 and bridges the two pipe sections.

The sleeve 4, shown in cross section in FIGURE 4, is of substantially the same width as the clamping band 3 and is provided on its inner surface with a centrally located annular ridge 5 which fits between the ends of the two pipes and prevents actual contact therebetween. The ridge 5 serves as a centering means to assure that sleeve is centered on the two pipe ends, and it further provides an expansion gap, a sound damper and an electrical insulator between the two pipe sections. The sealing sleeve is made of rubber or other elastomeric material which will provide the required chemical resistance to the material carried by the pipe line.

The clamping band 3, as illustrated in FIGURES 1–3, is preferably cast of ductile iron which has the corrosion resistant properties of gray cast iron and provides the required flexibility as will be explained below. Of course, the clamping band 3 can be made of stainless steel, low carbon steel or any other material which will provide adequate corrosion properties for the environment in which the joint is to be used. The clamping band comprises a split ring which is provided at its spaced apart ends with two pair of opposed bolting lugs 6 and 7. The lugs 6 are provided with bolt holes 8 while the lugs 7 are preferably provided with open slot 9 for receiving the bolts 10. This permits easy insertion of the bolts although the openings are not in accurate alignment.

A circumferential slit 11 is provided between the two sets of bolting lugs and it extends for more than half the circumference of the clamping band. In effect, the clamping band comprises two separate clamping bands which are joined together opposite the bolting lugs. This permits the two halves of the clamp to be tightened independently of each other and to different extents. Thus, the normal manufacturing tolerances can be easily accommodated and even a minimum size plain end pipe can be joined with a maximum size beaded end pipe.

The circumferential length of the coupling is made small enough to assure that the bolting lugs 6 and 7 remain separated after bolt 10 is tightened. In this manner, assurance is had that the clamping band will be tightened against the sealing sleeve 4. However, in order to provide compression of the gasket for the complete circumference of the pipes being joined, tongues 12 extend beyond the bolting lugs 7 at one circumferential end of the clamping band and extend into recesses 13 in the opposite end of the clamping band beneath clamping lugs 6. When each of bolts 10 are tightened lugs 6 and 7 are drawn toward each other, and tongues 12 slide into recesses 13. As mentioned above, clamping band 3 must be made of flexible material so that the band can accommodate itself to the shape and size of the pipe members about which it is tightened. In so doing, the sealing sleeve 4 is compressed completely around the circumference of each of the pipe sections to effect a fluid tight seal.

To assist in the coupling of beaded end pipe, a circumferential recess 14 is provided at the center of the clamping ring along the inside surface. When beaded end pipe are used, the adjacent part of sleeve 4 is pressed into this recess to the extent necessary to accommodate the raised beads on the ends of the pipe sections. If plain end pipe is used the recess will not be filled, but this is of no consequence since a seal is effected on both axial sides of the recess.

In order to increase the strength and rigidity of the coupling, ribs 15 which are parallel to the axis of the pipe are provided on the clamping band. These ribs are on the portion of the clamping band which is not divided by slit 11, and they do not increase the dimension of the clamping bank along the diameter parallel to the bolts 10. In this manner, a coupling for 3" pipe can be given adequate strength and rigidity and still have a diametrical dimension which permits its installation in a 2" x 4" stud wall. Of course, while the present joint is particularly useful for 3" pipe, it may be very suitable for other sizes also.

To assemble the joint the clamping band 3 is threaded over pipe section 1 or 2. The two pipe sections are inserted into sealing sleeve 4 so that the end of each pipe is in contact with ridge 5 on the sealing sleeve. Clamping band 3 is moved over the gasket, and the bolts 10, which were inserted through holes 13 in lugs 6 and on which the nuts were started before the assembly of the joint began, are pushed into the slots 9 in lugs 7. The nuts are then tightened to compress the sealing sleeve against the pipe sections and to complete the joint.

From the foregoing description of the presently preferred embodiment of the invention, it is believed that the invention may be readily understood by those skilled in the art. It should be understood that the invention is not limited to such embodiment as there might be changes made in form and arrangement of the parts without departing from the principle and scope of the invention as defined by the appended claims.

I claim:
1. A pipe joint for joining two pipe sections in end to end alignment, comprising: a unitary clamping band encircling and bridging adjacent ends of two pipe sections, each of said adjacent ends having a radially outwardly directed flange, the clamping band having, a longitudinal split providing it with two circumferentially spaced apart ends, two lugs at each of said ends providing two pairs of opposite lugs, the opposite lugs being circumferentially spaced apart lugs, the opposite lugs being circumferentially spaced apart sufficiently to prevent their coming together when the clamping band is tightened about the two pipe sections by drawing the ends closer together, a slit extending circumferentially between said two pairs of opposite lugs dividing the clamping band into two longitudinally side by side and independently adjustable split rings which are joined together for a portion of their circumference diametrically opposite the lugs, a tongue extending from one end of each of said adjustable split rings into a groove in the inside surface of the opposite end of the same adjustable split ring and a circumferential recess on the inner surface thereof positioned over and having an axial extent at least as great as the axial distance between the axially outermost portions of said flanges, said recess in said band having a radial depth substantially equal to the radial height of said flange; a unitary generally cylindrical sleeve of elastomeric material encircling and bridging the adjacent ends of the two pipe sections interposed between the clamping band and the pipe sections, said sleeve having an axial extent greater than the axial extent of said circumferential recess, the sleeve having at approximately the longitudinal midpoint of its internal surface a projection extending radially inward between the adjacent ends of the two pipe sections whereby the pipe ends are spaced and centered in the sleeve; and a bolt extending through each pair of lugs providing means for independently clamping each of the split rings about one of the two pipe sections to form a continuous circumferential ring of compression of the sleeve against each pipe section, the clamping band being substantially free of contact with the two pipe sections.

2. A pipe joint in accordance with claim 1 wherein the clamping band is provided with longitudinally extending reinforcing ribs in the region in which the two split rings are joined.

3. A pipe joint in accordance with claim 1 wherein the clamping band is cast of ductile iron.

References Cited

UNITED STATES PATENTS

| 1,192,150 | 7/1916 | Appleton | 285—177 X |
| 2,690,193 | 9/1954 | Smith | 285—373 X |
| 3,154,330 | 10/1964 | Clark | 285—419 |

FOREIGN PATENTS

| 238,825 | 6/1962 | Australia. |
| 644,697 | 7/1962 | Canada. |
| 704,902 | 3/1931 | France. |

CARL W. TOMLIN, *Primary Examiner.*

D. W. AROLA, *Assistant Examiner.*